United States Patent [19]
Fujii

[11] Patent Number: 6,119,239
[45] Date of Patent: Sep. 12, 2000

[54] INFORMATION PROCESSING SYSTEM WITH POWER SAVING AUDIO STATE

[75] Inventor: Kazuo Fujii, Yokohama, Japan

[73] Assignee: International Business Machines Corporation, Armonk, N.Y.

[21] Appl. No.: 09/139,014

[22] Filed: Aug. 24, 1998

[30] Foreign Application Priority Data

Aug. 27, 1997 [JP] Japan ................................. 9-230972

[51] Int. Cl.⁷ .................. G06F 1/32; G06F 1/26
[52] U.S. Cl. .................. 713/320; 713/300; 713/324; 327/356
[58] Field of Search ................ 713/320, 300, 713/324, 330, 322, 323; 381/119, 2; 327/356; 364/400.01

[56] References Cited

U.S. PATENT DOCUMENTS

| | | | |
|---|---|---|---|
| 3,823,399 | 7/1974 | Yamanaka | 343/14 |
| 5,881,317 | 3/1999 | Hampsten et al. | 710/62 |

*Primary Examiner*—Ario Etienne
*Attorney, Agent, or Firm*—Bernard D. Bogdon; Andrew J. Dillon

[57] ABSTRACT

An information processing apparatus with which power saving is enabled for the sound function in accordance with the activities of individual peripheral devices that output audio signals. A check is performed to determine whether or not the individual peripheral devices for outputting audio signals are in the muted state, and the mixer circuit is attenuated only when all the devices are in the muted state. The unused state of the sound function of the information processing apparatus is precisely detected, and power consumption can be reduced when the sound function is not in use. In addition, the "power control flag" in the I/O register of the audio controller is monitored, as well as the muted states of the individual peripheral devices. Therefore, even when the system software (e.g., a device driver for operating the audio controller) erroneously sets the power control flag during the reception of audio signals from a peripheral device, or when the playing of music is initiated by an audio function device, such as a CD-ROM drive, while the power control flag is set, the mixer circuit can be precisely re-enabled.

15 Claims, 5 Drawing Sheets

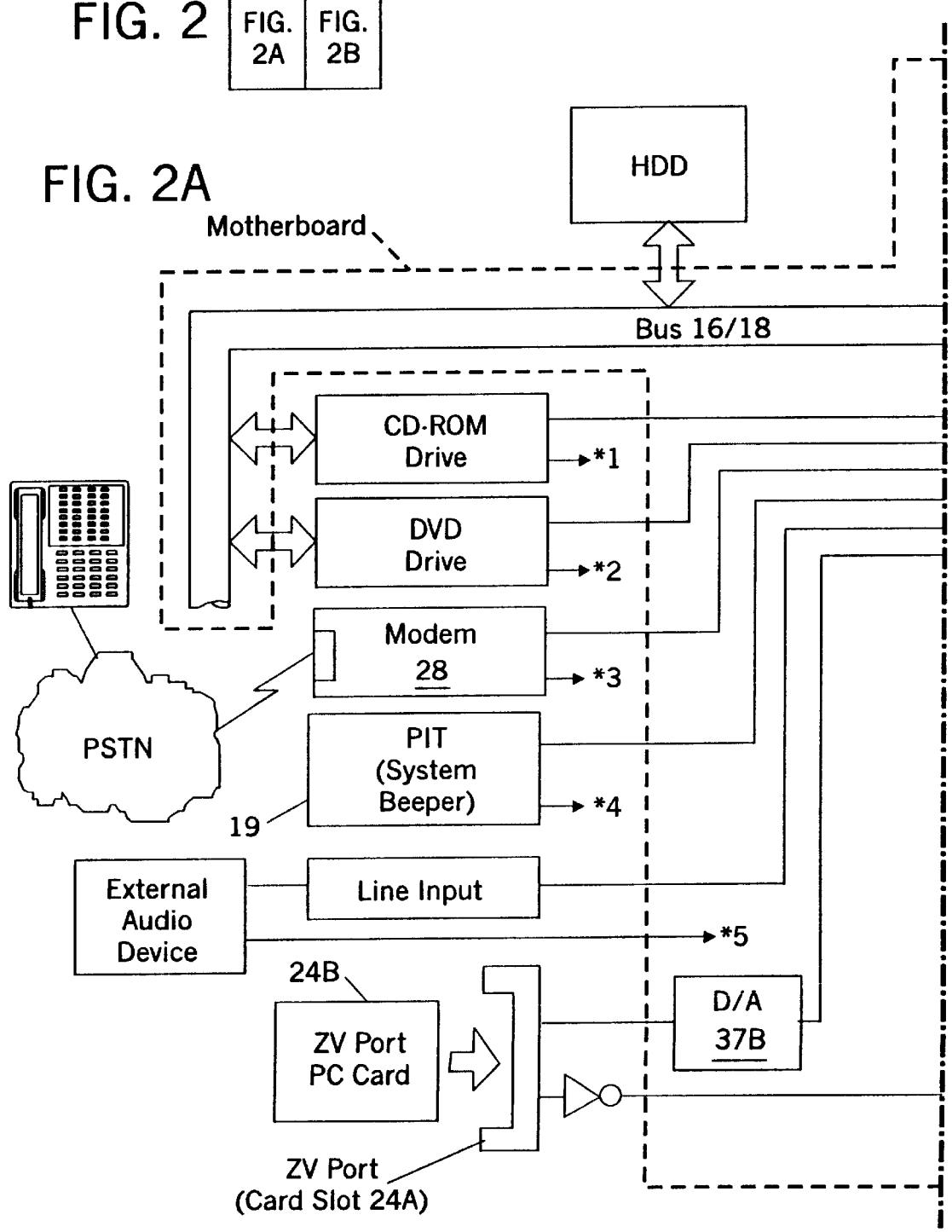

INFORMATION PROCESSING SYSTEM WITH POWER SAVING AUDIO STATE

FIELD OF THE INVENTION

The present invention relates to an information processing apparatus, such as a notebook PC (personal computer), and in particular to an information processing apparatus having a plurality of peripheral devices that perform an audio function. More specifically, the present invention pertains to an information processing apparatus that is designed for power saving, and in particular to an information processing apparatus that performs power saving for a sound function in accordance with the muted state of peripheral devices having an audio function.

BACKGROUND OF THE INVENTION

In accordance with technological developments, various types of personal computers (PCS), such as desktops, towers and notebooks, have been developed and are being sold. The notebook PCS are made compactly and light, while taking portability and mobility for outdoor use into consideration.

One feature of a notebook PC it is "battery-operated type" that can be driven by an internally mounted battery power source. The battery is provided because a notebook PC is often employed in a mobile environment in which no commercially available power source is available. A battery power source used for a notebook PC is generally a "battery pack" in which a plurality of battery cells, such as Li-lon, NiCd or NiMH, are connected together. Such a battery pack weighs several hundreds of grams and outputs a voltage of from 4 to 12 V. While a battery pack of this type has a power capacity that lasts at most two to three computer operating hours, two to three hours are also required to charge it. The long charging hours constitute a serious problem for such a battery-operated apparatus, and a user must carry one or more spare battery packs in reserve. For this reason, for the notebook PC, a variety of power saving methods have been proposed that can extend the battery operating hours, even if only for a short period of time. The power saving function can be said to be another feature of the notebook PC.

Further, reflecting the ecological viewpoint, there has been an increased interest in saving on the power that is used to run desktop PCS, which are installed in offices and are driven by the endless power provided by commercially available power sources. The Environmental Preservation Association (EPA) announced a voluntary regulation called the "Energy Star Computer Program" in June of 1993, and recommended that the power consumption in the standby state be a reference level or lower (a driving power of 30 W or below, or 30% or less than is required for full operation of a CPU). Since the announcement, computer makers have competitively developed and manufactured products that comply with the proposed regulation.

The foundation or basis of the power saving design for various electric/electronic apparatuses, including PCS, is the halting of the power supply to devices and circuits that are not in use. A power saving design for a hard disk, which is one of the peripheral devices employed with a computer system, is disclosed in, for example, U.S. Pat. No. 4,933, 785. The hard disk halts the supply of power to the internal electrical circuits in accordance with the state of the hard disk, i.e., in accordance with the time elapsed since the last disk access.

Recently, there has been rapid expansion of the multimedia function for PCS, i.e., a function for mixing computer data, and various other elements, such as motion and still pictures, and sound and characters, on a computer system. Since so-called multimedia data includes enormous files, such as for color image data, a multimedia PC must incorporate an external, portable storage device, such as a CD-ROM drive or a DVD (Digital Video Disc or Digital Versatile Disc) drive, that can hold such a large volume of data. Since the multimedia function is employed, for example, in the communication and broadcasting fields for TV conference presentations and color facsimiles, a device, such as a modem or a LAN card, must be mounted in a PC to provide a network connection, and this has led to the introduction of a PC card slot compatible ZV (Zoom Video) standard to support the moving picture function. A ZV port PC card transfers data directly to a video controller to implement the fast display of moving pictures.

A sound function, as well as the video function, is indispensable to the operation of a multimedia PC because one type of multimedia data handled by many of the peripheral devices associated with the multimedia function is audio data. To implement the PC sound function, an audio controller on a motherboard performs the mixing/volume adjustment and the D/A (Digital/Analog) conversion of audio signals supplied by the peripheral devices, an audio amplifier amplifies the resultant signals, and the amplified signals are either output at a loudspeaker, or are output to a line leading to an external audio device.

The power saving design for the PC will be explained hereinafter. As was previously described, the halting of the power supply to circuit modules that are not in use is essential for power saving; however, few power saving designs for the sound function has been put forward for the PC. This is partially because since there are many peripheral devices, such as CD-ROM drives, DVD drives, system beepers and modems, that are employed for the output of audio signals, and it is difficult to precisely detect the state when the sound function is not in use (or the state in which all the audio signals are muted).

An audio controller chip mounted on the motherboard of a PC usually has a power saving function that can be set or released by system software. That is, a specific bit of an I/O register in an audio controller is defined as a "power control flag," and when specific system software (e.g., a device driver for operating the audio controller) sets the flag to "1" in response to an I/O write access, the audio controller falls into the low-power consumption state in which the operation of the audio controller is disabled.

However, if the sound function of the system (e.g., an audio amplifier or a mixer circuit in an audio controller) is erroneously disabled while audio (CD-DA (Digital Audio)) data are being played by a CD-ROM drive, the audio data read from the disk are not output externally. This is because, even when the drive is changed from the muted state to the unmuted state, the PC can not detect such a state transition and, therefore, can not again enable the sound function in accordance with the operation of the drive. An external storage device having an audio function, such as a CD-ROM drive, can play audio data (in this case, perform line input to a PC) not only upon receipt of a host command from the PC, but also in response to the manipulation of a play button provided for the CD-ROM drive. When the play button is used, the PC software can not detect the muted state of the drive.

In other words, an audio output module, such as an audio controller, must be kept all the time in the active state in order to ensure normal operation of the PC sound function. Conventionally, even though an audio controller may have a power saving function that uses the "power control flag," the function is not actually utilized. Although in the active state, for example, the mixer circuit in the audio controller consumes several hundreds of mW of power, and such a consumption of power in the non-audio output state can not be ignored when a PC is battery operated.

SUMMARY OF THE INVENTION

It is, therefore, one object of the present invention to provide a superior information processing apparatus designed for power saving. It is another object of the present invention to provide a superior information processing apparatus that performs power saving in accordance with the idle state of a peripheral device. It is an additional object of the present invention to provide a superior information processing apparatus with which power saving is enabled for the sound function in accordance with the activities of individual peripheral devices that output audio signals.

To achieve the above objects, according to a first aspect of the present invention, an information processing apparatus includes: one or more peripheral devices for outputting audio signals, and a mute signal that indicates a muted state in which the peripheral device is not generating audio signals; a mixer circuit for mixing the audio signals received from the peripheral devices and for regulating audio volume; output device for externally outputting audio signals provided by the mixer circuit; and an AND gate for calculating a logical product using the mute signals received from the peripheral devices and for, when all the mute signals are in the muted state, outputting a control signal for attenuating the mixer circuit.

According to a second aspect of the present invention, an information processing apparatus includes: one or more peripheral devices for outputting an audio signal, and a mute signal that indicates a muted state in which the peripheral device is not generating audio signals; a mixer circuit for mixing the audio signals received from the peripheral devices and for regulating audio volume; output apparatus for externally outputting audio signals provided by the mixer circuit; and power saving means for monitoring the peripheral devices whether or not the peripheral devices are in the muted state in which audio signals are not generated, and for, when all the peripheral devices are in the muted state, switching the mixer circuit to a power saving state.

According to a third aspect of the present invention, an information processing apparatus includes: (a) a processor for executing a software program; (b) a memory used for temporarily storing program code and data that are being processed; (c) a bus for connecting the processor to individual sections; (d) one or more peripheral devices for outputting an audio signal, and a mute signal that indicates a muted state in which the peripheral device is not generating audio signals; (e) an audio controller, which includes an I/O register to be accessed via the bus, and a mixer circuit, for mixing the audio signals received from the peripheral devices and for regulating audio volume, whereby a specific bit of the I/O register is defined as a power control flag and a "1" is set at the power control flag to designate a power saving state of the mixer circuit; (f) output circuitry for externally outputting audio signals provided by the mixer circuit; (g) a first AND gate for calculating a logical product using the mute signals received from the peripheral devices and for, when all the mute signals are in the muted state, outputting a first control signal to attenuate the mixer circuit; and (h) a second AND gate for receiving the first control signal from the first AND gate and a second control signal reflecting the value of the power control flag, and for outputting a third control signal to attenuate the mixer circuit.

In the information processing apparatus according to the first to the third aspects, the output system may include an audio amplifier for amplifying the output of the mixer circuit, and a loudspeaker for releasing the output of the audio amplifier. Otherwise, the output device may include an audio amplifier for amplifying the output of the mixer circuit and a line output terminal for externally transmitting the output of the audio amplifier.

According to a fourth aspect of the present invention, a mixer circuit power saving device, which is used for an information processing apparatus including one or more peripheral devices for outputting an audio signal and a mixer circuit for mixing the audio signals and regulating audio volume, includes: circuitry for receiving from the peripheral devices mute signals indicating a muted state in which no audio signals are generated; and a device for calculating a logical product using the received mute signals and for outputting a control signal to attenuate the mixer circuit when all the peripheral devices are in the muted state.

According to a fifth aspect of the present invention, a mixer circuit power saving device, which is used for an information processing apparatus including one or more peripheral devices for outputting an audio signal and a mixer circuit for mixing the audio signals and regulating audio volume, includes: a monitor device for monitoring the peripheral devices to determine whether the peripheral devices are in a muted state in which no audio signals are generated; and power saving assemblage for switching the mixer circuit to a power saving state only when all the peripheral devices are in the muted state.

According to the individual aspects of the present invention, an example peripheral device for outputting an audio signal is a CD-ROM drive, a DVD drive, a system beeper, or a ZV port PCMCIA card slot. The modem enters the unmuted state at the time it goes off-hook, which corresponds to the speech state, and enters the muted state at the time it goes on-hook. Since the PCMCIA card slot outputs an audio signal only when it is used as a ZV port, it is in the muted state when a normal PC card is inserted.

The information processing apparatus and the power saving device of the present invention determine whether or not the individual peripheral devices for outputting audio signals are in the muted state, and attenuate the mixer circuit only when all the devices are in the muted state. In other words, the unused state of the sound function of the information processing apparatus is precisely detected, and power consumption can be reduced when the sound function is not in use.

The information processing apparatus in the third aspect monitors the "power control flag" in the I/O register of the audio controller, as well as the muted states of the individual peripheral devices. Therefore, even when the system software (e.g., a device driver for operating the audio controller) erroneously sets the power control flag during the reception of audio signals from a peripheral device, or when the playing of music is initiated by an audio function device, such as a CD-ROM drive, while the power control flag is set, the mixer circuit can be precisely re-enabled. For the power saving process to be performed for the sound function, the "power control flag" need only be consistently set to "1."

Other objects, features and advantages of the present invention will become apparent from the following detailed description of the preferred embodiment including the accompanying drawings.

DETAILED DESCRIPTION OF THE PREFERRED EMBODIMENT

Figure 1A:
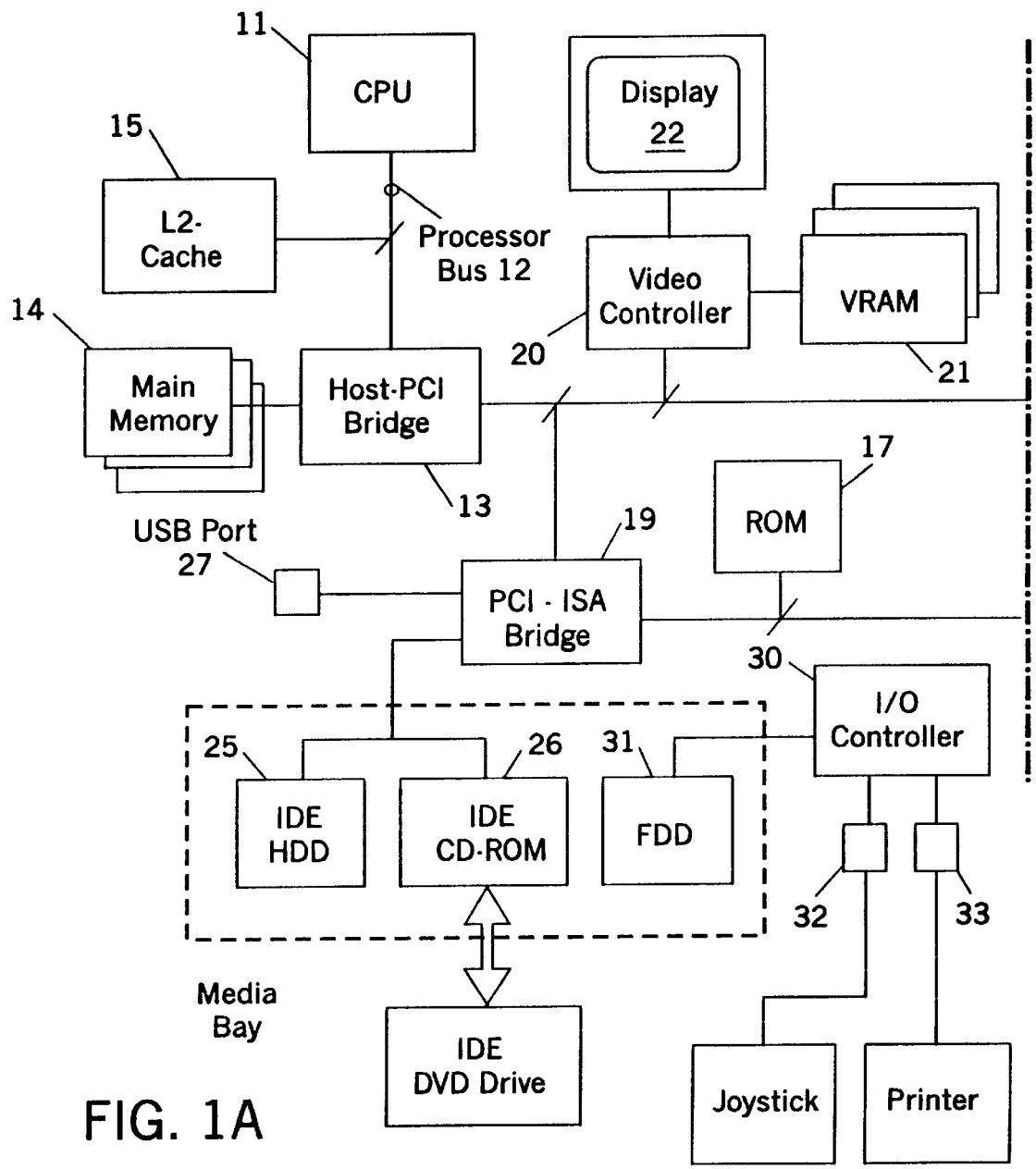
FIG. 1 is a schematic diagram showing the hardware arrangement of a typical personal computer (PC) according to the principles of the present invention.
Figure 1:
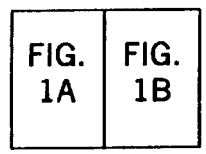
Figure 1B:
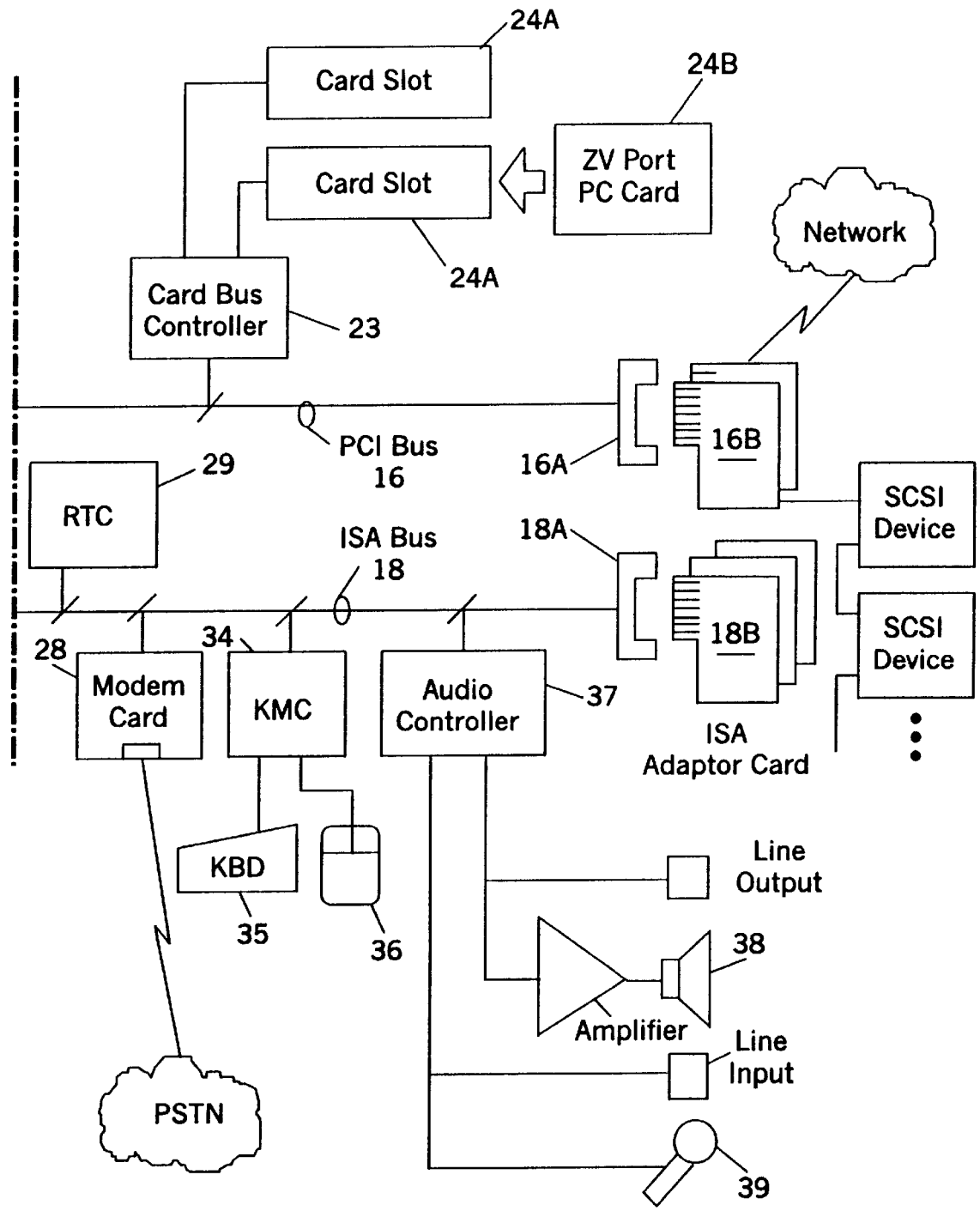

FIG. 1 is a schematic diagram illustrating the hardware arrangement of a typical personal computer (PC) 100 embodying the present invention. The PC 100 conforms to the OADG (PC Open Architecture Developer's Group) specifications, and either "Windows 95" of Microsoft Corp. or "OS/2" of IBM Cor. is mounted as an operating system (OS).

A CPU 11, a main controller, executes various programs under the control of the OS. The CPU 11 is, for example, a CPU "Pentium" chip or an "MMX technology Pentium" chip, each of which is produced by Intel Corp.

The CPU 11 is connected to hardware components, which will be described later, through a processor bus 12, which is connected to its external pins; a PCI (Peripheral Component Interconnect) bus 16, which acts as a local bus; and an ISA bus (Industry Standard Architecture) bus 18, which acts as a system bus.

The processor bus 12 and the PCI bus 16 communicate with each other through a bridge circuit (a host-PCI bridge circuit) 13. The bridge circuit 13, in this embodiment, includes a memory controller for controlling an operation for accessing a main memory 14, and a data buffer for absorbing a data transfer speed difference between the buses 12 and 16.

The main memory 14 is volatile memory and is used as a writing area for an executing program of the CPU 11, or as a work area for the program. Generally, the main memory 14 consists of a plurality of DRAM (Dynamic RAM) chips. A memory capacity of, for example, 32 MB is provided as a standard and can be expanded to 256 MB. The programs to be executed include device drivers that access an OS such as Windows 95, and various application programs.

An L2-cache 15 is high-speed memory for absorbing the time required by the CPU 11 to access the main memory 14. A very limited amount of program code and data that the CPU 11 frequently accesses are temporarily stored in the L2-cache 15. Generally, the L2-cache 15 consists of SRAM (Static RAM) chips, and its memory capacity is, for example, 512 KB.

The PCI bus 16 is a bus for a relatively fast data transfer (a bus width of 32/64 bits, a maximum operating frequency of 33/66 MHZ and a maximum data transfer speed of 132/264 MBps). PCI devices, such as a video controller 20 and a card bus controller 23, that are operated at relatively high speeds are connected to the PCI bus 16. The PCI architecture was originated and advocated by Intel Corp., and implements a so-called PnP (Plug-and-Play) function.

The video controller 20 is a dedicated controller for the actual processing of graphics commands received from the CPU 11. The processed graphics information is temporarily written in a screen buffer (VRAM) 21, and is then read from the VRAM 21 and output as graphics data to an LCD (liquid crystal display) or a CRT (cathode ray tube) display 22.

The card bus controller 23 is a dedicated controller for directly transmitting a bus signal on the PCI bus 16 to the interface connector (card bus) of a PC card slot 24A. A PC card 24B, which conforms to the specifications (e.g., "PC Card Standard 95") determined by the PCMCIA (Personal Computer Memory Card International Association)/JEIDA (Japan Electronic Industry Development Association), can be inserted into the card slot 24A (two Type-2 cards or one Type-3 card). An example PC card 24B is a LAN card for network connection, an HDD incorporated card employed as an external storage device, or a SCSI (Small Computer System Interface) card for external connection to a SCSI device. In addition, a PC card and a card slot for a ZV (Zoom Video) port are also provided. The ZV port PC card enables a quick display for motion pictures by transferring data directly to the video controller 20 as described.

A PCMCIA connector (not shown) provided at the rear of the card slot 24A has 68 pins and constitutes a well known arrangement. One of the connector pins is defined as an identification pin that indicates, for example, whether the inserted PC card is either a common PC card or a ZV port PC card. The ZV port card slot 24 has a special connector pin for audio signal output. When the ZV port PC card is not inserted, no audio signal is output from the PC card, and the card slot 24A is in the muted state. When the ZV port PC card is inserted, the card slot 24A is in the unmuted state.

The PCI bus 16 and the ISA bus 18 are mutually connected by a bridge circuit (PCI-ISA bridge circuit) 19. The bridge circuit 19, in this embodiment, includes a DMA controller, a programmable interrupt controller (PIC) and a programmable interval timer (PIT). The DMA controller is a dedicated controller for performing a data transfer between a peripheral device and the main memory 14 that does not pass through the CPU 11. The PIC is a dedicated controller for executing a program (an interrupt handler) in response to an interrupt request (IRQ) from each peripheral device. The PIT is a device for generating a timer signal at a predetermined cycle. The cycle for the timer signal generated by the PIT is programmable, and the timer signals are, for example, a cyclic interrupt provided for the OS/BIOS (Basic Input/Output System) at intervals of 55 msec, a DRAM refresh timer signal the level of which is changed at intervals of 15.2 μsec, and a tone generation signal for the generation of a beep tone. The PIT serves also as a system beeper.

The bridge circuit 19 in this embodiment also includes an IDE (Integrated Drive Electronics) interface for connecting external storage devices that conform to the IDE specifications. A maximum of two IDE devices can be connected to a single IDE interface. Usually, an IDE hard disk drive (HDD) 25 for software installation is connected as a master, and an IDE CD-ROM drive 26 is connected as a slave. Another type of IDE device, such as a DVD (Digital video Disc or Digital Versatile Disc) drive, may be connected instead of a CD-ROM drive. These external storage devices are stored in the storage space called a "media bay" or a "device bay" in the PC and can be exchanged with a battery pack, for a notebook PC, or a floppy disk drive (FDD).

The data transfer speed of the HDD 25 is at a preferred level to that of other external storage devices. A software program, i.e., an OS or an application, copied to the HDD 25 is in the standby state for use by the system 100, i.e., installation is completed. The CD-ROM drive 26 can be used both to replay CD music data (CD-DA data) and to read computer data (CD-ROM data). A computer program to be installed in the system 100, for example, can be supplied as a CD. The DVD drive is a device for handling a DVD, which is one type of optical disk, and there are a read-only DVD-ROM drive and a random access DVD-RAM drive. The data transfer speed for the DVD drive is equivalent to that of a 10×CD-ROM drive. The DVD is a storage medium on which various elements, including video images, can be stored, and on one side has a memory capacity of 4.7 GB (133 filming minutes).

The CD-ROM drive 26 and the DVD drive mounted in the PC 100 in this embodiment are connected to the motherboard through the IDE connector, and they output both audio signals and mute signals, which are described hereinafter. Except for the replaying of music data, the CD-ROM drive 26 and the DVD drive are set to the muted state, which is also described hereinafter.

The bridge circuit 19 in this embodiment has a USB route controller for connecting a USB (Universal Serial Bus), a general purpose bus, and a USB port 27. The USB supports a hot plugging function for inserting and removing an additional peripheral device (a USB device) while the system 100 is powered on, and a plug-and-play function for automatically identifying a newly connected peripheral device and reconfiguring a system configuration. A maximum 63 USB devices can be connected to a single USB port in a daisy chain manner. Exemplary USB devices are a keyboard, a mouse, a joystick, a scanner, a printer, a modem, a display motor and a tablet.

The ISA bus 18 is a bus along which the data transfer speed is lower (a bus width of 16 bits and a maximum data transfer speed of 4 MBps) than it is for the PCI bus 16. The ISA bus 18 is used to connect peripheral devices, such as a ROM 17, a modem card 28, a real time clock (RTC) 29, an I/O controller 30, a keyboard/mouse controller (KMC) 34 and an audio controller 37, that are driven at a relatively low speed.

The ROM 17 is a read-only memory for the permanent storage of a code group (BIOS: Basic Input/Output System) for the input and output signals for the hardware components, such as a keyboard 35 and the floppy disk drive (FDD) 31, and a test program (POST: Power On Self Test) that is run when the system 100 is first powered-on.

The modem card 28 is a device for transmitting digital computer data across an analog public switched telephone network (PSTN). The modem card 28 includes circuit components, such as a signal processor (a modem chip), for modulating transmitted data and demodulating received data, and a data access arrangement circuit (DAA), for connecting a modem to a public switched telephone network in accordance with the line switch standards of individual countries. The modem card 28 is connected to the ISA bus 18, and outputs an audio signal and a mute signal to the motherboard, which are described hereinafter. The modem enters the unmuted state at the time it goes off-hook, which corresponds to the communication state, and enters the muted state at the time it goes on-hook.

The real time clock (RTC) 29 is a device for measuring the current time. Generally, the RTC 29 and a CMOS memory (not shown) are mounted together on a single chip. The CMOS memory is used to store information, such as system configuration information and a power ON password, that is required for the security/safety of the system 100. The RTC/CMOS 29 is backed up by a reserve battery (ordinarily a coin battery: not shown) so that the contents obtained by measurement and the stored data are not lost when the system 100 is powered-off.

The I/O controller 30 is a peripheral controller for driving the floppy disk drive (FDD) 31, and controlling the input/output of parallel data through a parallel port 33 (PIO) and the input/output of serial data through a serial port 32 (SIO). A printer, for example, is connected to the parallel port 33 and a modem or a joystick is connected to the serial port 32.

The keyboard/mouse controller (KMC) 34 is a peripheral controller for fetching, as scan code input by the keyboard 35, or as coordinate values designated by the pointing device (e.g., a mouse or a Trackpoint(TM) device) 36.

The audio controller 37 is a dedicated controller for processing the input/output of an audio signal, and includes a CODE (Coder-decoder, an A/D and D/A converter having a mixing function) for digital recording and the replaying of audio signals. An audio signal is input as a sound from a microphone 39, or as a line input from an external audio device (not shown). A generated audio signal is output to line to an external audio device (not shown) or is amplified by an audio amplifier and the resultant signal is released at a loudspeaker 38. The audio controller 37 may conform to the "AC (Audio Code) '97" specifications, which are determined by Analog Device Inc., Creative Labs, Inc., Intel Corp., National Semiconductor Corp. and Omaha Co., Ltd.

One or more PCI bus slots 16A or ISA bus slots 18B are provided at one end of the bus 16 or the bus 18. The bus slots 16A or 18A are exposed at one part of the wall of the PC 100, for example and they may also be provided by a notebook PC docking station. PCI adaptor cards 16B and ISA adaptor cards 18B can respectively be inserted into the bus slots 16A and 18A. An example adaptor card is a LAN card for the connection of the PC 100 to a network. Another example is a SCSI (Small Computer System Interface) card for external connection of the PC 100 to a SCSI device, such as an HDD, a CD-ROM drive, a DVD drive or a printer.

A typical user of the personal computer 100 can operate the system by using the keyboard 35 or the mouse 36 to execute various application programs, such as word processing, spreadsheet, and communication programs, and to assist him or her to perform a job while viewing a display screen (e.g., on the desktop).

A so-called personal computer currently available on the market fully satisfies the hardware conditions that will enable it to serve as the computer system 100 in FIG. 1. Although many electric circuits other than those shown in FIG. 1 are required to construct the computer system 100, they are well known to one having ordinary skill in the art, and are not directly related to the subject of the present invention. Further, it should be noted that, to avoid making the drawings overly complex, only one part of the connections between the hardware blocks in FIG. 1 is shown.

Figure 2B:
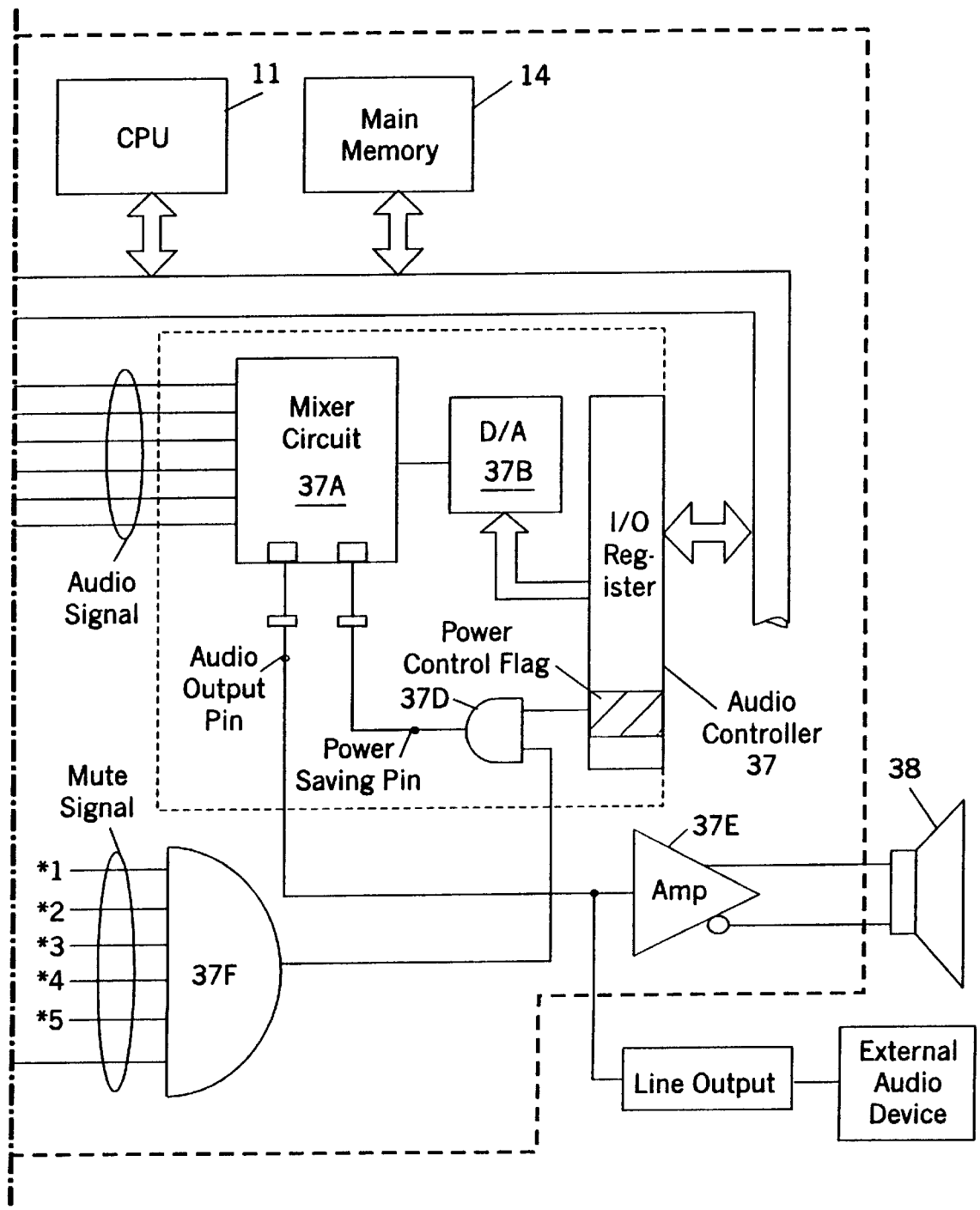
FIG. 2 is a diagram illustrating the sound function of the personal computer of FIG. 1.

In FIG. 2 is shown the sound function in the PC 100. The system 100 includes, as supply sources for audio data, the CD-ROM drive, the DVD drive, the modem card 28, the system beeper, the external audio device, the ZV port PC card 24A and the HDD. The audio controller 37, which is an audio data recording/replaying unit, is mounted on the motherboard. The CPU 11 and the main memory 14 are also mounted on the motherboard as is well known.

The audio controller 37 includes a mixer circuit 37A, a D/A converter 37B, an I/O register 37C and an AND gate 37D. The mixer circuit 37A mixes analog audio signals supplied by the individual peripheral devices and regulates the audio volume.

The I/O register 37C is connected to the buses 16 and 18, and a bus master unit that includes the CPU 11 can access the I/O register 37C for reading and writing. The I/O register 37C includes a data register, an address register, a control register and a status register. The CPU 11 writes a command to the I/O register 37C to instruct the audio controller 37 to input or output audio data. The digital audio data written to the I/O register 37C are converted into analog data by the D/A converter 37B, and the analog data are transmitted to the mixer circuit 37A. A specific bit in the I/O register 37C is defined as a power control flag.

The AND gate 37D receives a signal that reflects the value of the power control flag, and a signal output by another AND gate 37F, which is described hereinafter, and outputs a signal to the power saving pin of the mixer circuit 37A. The mixer circuit 37A performs a normal operation when the signal input at the power saving pin is low, but when the signal input at the power saving pin is high, the operation is attenuated and the power consumption is reduced.

The signal output by the mixer circuit 37A is externally transmitted to an external audio device through a line output terminal, or is amplified by an audio amplifier 37E and the resultant signal is output as sound at the loudspeaker 38. The audio amplifier 37E, which is a circuit component other than the audio controller chip 37, is mounted on the motherboard. The audio data from the peripheral devices are supplied as either audio signals or sound file data (i.e., computer data).

Audio signals are employed for supplying data to, for example, the CD-ROM drive, the DVD drive, the modem card 28, the system beeper, the external audio device and the ZV port PC card. The CD-ROM drive and the DVD drive transmit, to the mixer circuit 37A, the audio signals read from the media, such as a CD and a DVD loaded into the drives (see FIG. 2). The modem card 28 is connected to another telephone (or another computer system having a telephone function) through the analog public switched telephone network, and transmits to the mixer circuit 37A the audio signals received from a caller (see FIG. 2). The PIT in the bridge circuit 19 serves as a system beeper that generates a rectangular wave having a predetermined cycle as a tone generation signal (previously described), and transmits the tone generation signal as an audio signal to the mixer circuit 37A (see FIG. 2). The external audio device transmits an audio signal from the line input terminal to the mixer circuit 37A (see FIG. 2). An audio signal is also output at the ZV port PC card 24B, which is inserted into the PC card slot 24A. It should be noted that since an audio signal output by the card 24B is digital data, it is converted into an analog signal by the D/A converter mounted on the motherboard, and the analog signal is transmitted to the mixer circuit 37A (see FIG. 2).

The HDD, the CD-ROM drive and the DVD drive supply audio data as sound file data. A sound file is a Windows WAV (wave) file (normally having a file name of "*.wav"), an AIF, an SND, a VOC, a MID (MIDI) or an RMI file. The external storage devices, such as the HDD, the CD-ROM drive and the DVD drive, are connected to the CPU 11 by the buses 16 and 18. The CPU 11 (more specifically, a software program executed by the CPU 11) reads a sound file from a storage medium (i.e., a hard disk or a loaded CD or DVD) in the external storage device, performs a predetermined process for the file, and transmits the result to the audio controller 37. The digital audio data written to the I/O register 37C are converted into analog data by the D/A converter 37B, and the analog data are transmitted to the mixer circuit 37A as previously described. The HDD, the CD-ROM drive and the DVD drive in FIG. 2 may be either IDE devices connected by an IDE interface, or SCSI devices externally connected by a SCSI card. In other words, the present invention is not affected by connection interfaces for these external storage device.

The CPU 11 (more specifically, a software program executed by the CPU 11) can access the power control flag in the I/O register 37C to set or release it. When the flag is "1," this indicates the mixer circuit 37A is in a power saving mode, and when the flag is "0," this indicates it is in the normal mode. The supply of audio data in the form of a sound file is transparent to the CPU 11. Therefore, the CPU 11 can set the power control flag while no sound file is being read, and can release it once the reading of the sound file is begun.

In this embodiment, the peripheral devices that output audio signals, i.e., the CD-ROM drive, the DVD drive, the modem card 28, the system beeper, the external audio device and the ZV port PC card slot 24A, also output mute signals. The mute signals are received by the AND gate 37F on the motherboard. The signal from the AND gate 37F is transmitted to the AND gate 37D. The AND gate 37D also receives a signal that reflects the value of the power control flag, and outputs it to the power saving pin of the mixer circuit 37A. While the AND gate 37F is a circuit component mounted on the motherboard, the AND gate 37F, as well as the AND gate 37D, may alternately be mounted in the audio controller chip 37. In this embodiment, in order to simplify the circuit structure, the AND gate 37F receives five mute signals and is provided outside the audio controller 37.

The power saving operation of the mixer circuit 37A will now be discussed. As was previously described, the AND gate 37F monitors mute signals transmitted by the peripheral devices, and outputs a high level signal only when all the peripheral devices are in the muted state, i.e., the sound function is not in use. The AND gate 37D receives the output of the AND gate 37F and a signal that represents the value of the power control flag. As a consequence, the AND gate 37D supplies a high level signal to the power saving pin of the mixer circuit 37A when the power control flag is set and all the peripheral devices are in the muted state. The mixer circuit 37A performs a normal operation when the signal input at the power saving pin is low, and when the signal input at the power saving pin is changed to high, the operation is attenuated and the power consumption is reduced.

Therefore, even when the system software of the CPU 11 erroneously sets the power control flag, so long as at least one of the peripheral devices is changed to the unmuted state, the mixer circuit 37A can be correctly enabled again, and the sound function is performed normally. In addition, even when the playing of music is initiated by a CD-ROM drive or an external audio device upon the manipulation of device's play button, the mixer circuit 37A can be enabled again, and the sound function can be performed normally.

A mute signal may not be output by the modem card 28. In this case, an off-hook signal issued by the modem card 28 is used as the mute signal.

The external storage devices having an audio function, such as the CD-ROM drive or the DVD drive, are connected to the motherboard of the PC 100 by an interface connector, such as an IDE or a SCSI connector. Thus, when the internal audio system circuit of the external storage device outputs a mute signal, that internal mute signal is fetched to the motherboard across the interface connector, so that the mute signal described in FIG. 2 can be obtained.

The external audio device transmits an audio signal through the line input terminal to the PC 100; it may also output a mute signal.

Figure 3:
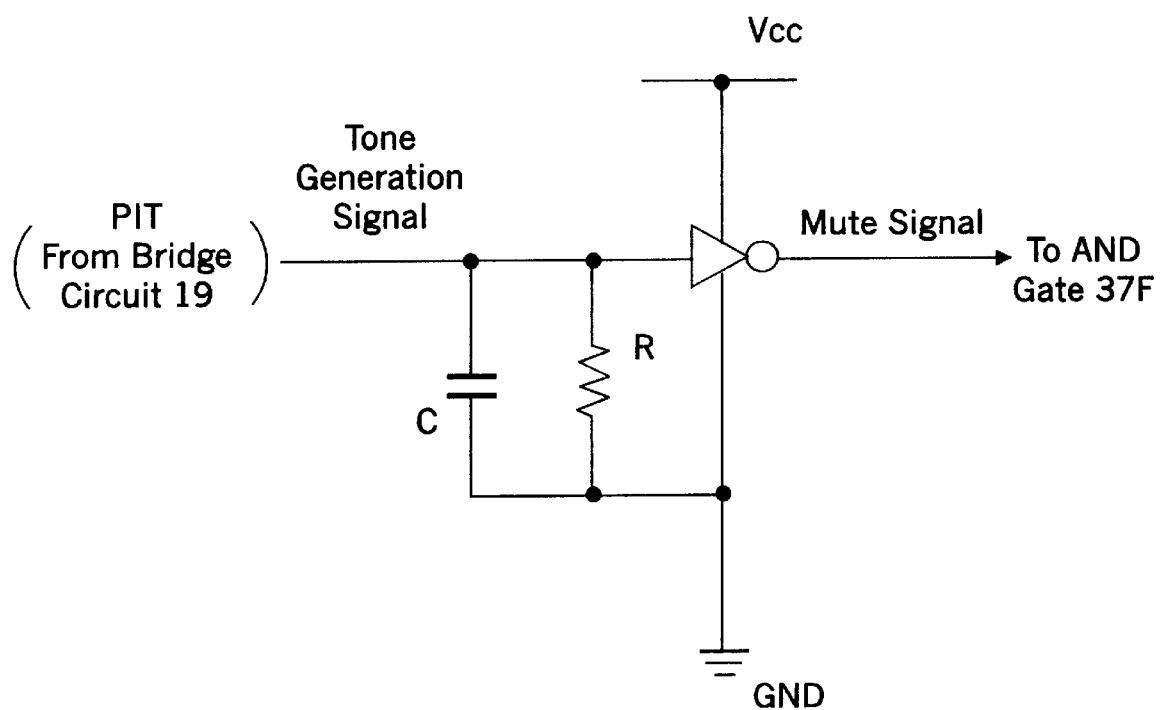
FIG. 3 is a diagram illustrating the arrangement of a beep sound detector.

The system beeper detects a tone generation signal to use as a mute signal. FIG. 3 is diagram showing an example "beep detector" for detecting such a tone generation signal. The tone generation signal is a continuous rectangular wave, as previously described. The beep detector includes an integral circuit, consisting of a capacitor (C) and a resistor (R) that are connected in series, the output of which is inverted by an inverter. Therefore, when the tone generation signal is received, i.e., the continuous rectangular wave is received, the output of the beep detector is negated and the unmuted state is indicated. When no tone generation signal is received, the output of the beep detector is asserted and the muted state is indicated. The system beep generator is the previously described programmable interval timer (PIT) in the bridge circuit 19.

The PC card slot 24A does not output a mute signal. None of the 68 signal pins constituting the PCMCIA connector are assigned to carry a mute signal, but there is an identification pin used for notifying the system of the insertion of the ZV port PC card. Since no audio signal is output other than when the ZV port PC card is inserted, the identification pin can be used for a mute signal. For the card bus controller chip "PCI1250" from Texas Instruments Corp., of its external pins, bit pins of bit Nos. 7 and 6 are employed to represent the attribute of an inserted card. That is, when the two bit pins have a bit value of "00," this indicates the activity as the normal PC card socket, whereas value of "01" indicates that the ZV output (i.e., the audio signal output) is enabled. In other words, the period during which the bit value is "01" the PC card socket is in the unmuted state.

The present invention has been described in detail while referring to a specific embodiment. However, it should be obvious to one having ordinary skill in the art that various modifications or revisions of the embodiment are possible within the scope of the present invention. In this embodiment, an explanation was given for an apparatus that is based on a so-called PC/AT compatible machine ("PC/AT" is a trademark of IBM Corp.) that conforms to the OADG specifications. However, the present invention can be applied in the same way by using another type of apparatus, e.g., an apparatus based on the NEC PC 98 series, the Macintosh from Apple Computer Inc., or a machine that is compatible with either computer. That is, although the present invention has been disclosed by using an example, it should not be limited to that example. To fully understand the subject of the present invention, the claims should be referred to.

As is described above, according to the present invention, provided is a superior information processing apparatus that includes for the sound function a means for saving power in accordance with the activities of the individual peripheral devices that output audio signals.

What is claimed:

1. An information processing system, comprising:
    a plurality of mute signal enabled audio devices that output audio signals and mute signals, wherein said mute signals indicate a muted state of said audio devices during a time in which said audio devices do not output audio signals;
    a plurality of non-mute signal enabled audio devices that output only audio signals;
    a plurality of mute logic circuits coupled to receive signals from non-mute signal enabled audio devices for generating mute logic signals, wherein said mute logic signals indicate a muted state of said non-mute signal enabled audio devices during a time in which said non-mute enabled audio devices do not output audio signals;
    a power saving circuit coupled to receive said mute signals and mute logic signals for generating a power saving signal, wherein said power saving signal indicates a power saving state when all of said mute signals and all of said mute logic signals indicate said muted state; and
    an audio mixer circuit coupled to receive said audio signals and said power saving signal, for mixing said audio signals, and for regulating audio volume of said audio signals, wherein said audio mixer circuit attenuates when said power saving signal indicates said power saving state such that said audio mixer circuit is able to save power during times in which said audio signals are not being generated.

2. The information processing system of claim 1, wherein said power saving circuit further comprises a system power state input for receiving a system power state signal, wherein said power saving signal indicates a power saving state only when all of said mute signals, all of said mute logic signals, and system power state signal indicate said muted state.

3. The information processing system of claim 1, wherein one of said plurality of mute signal enabled audio devices is a modem.

4. The information processing system of claim 1, wherein one of said plurality of mute signal enabled audio devices is a CD-ROM drive.

5. The information processing system of claim 1, wherein one of said plurality of mute signal enabled audio devices is a DVD drive.

6. The information processing system of claim 1, wherein one of said plurality of non-mute signal enabled audio devices is a system buzzer.

7. The information processing system of claim 1, wherein one of said plurality of non-mute signal enabled audio devices is a ZV port PCMCIA card slot.

8. The information processing system of claim 1 further comprising an audio amplifier coupled to said audio mixer for amplifying audio signals.

9. A method of reducing power consumption in a system which includes both mute signal enabled audio devices and non-mute signal enabled audio devices, comprising the steps of:
    generating mute signals and audio signals from said of mute signal enabled audio devices, wherein said mute signal indicate a muted state during a time in which said mute signal enabled audio devices are not generating audio signals;
    generating only audio signals from said non-mute signal enabled audio devices;
    generating mute logic signals, wherein said mute logic signals indicate a muted state during a time in which said non-mute signal enabled audio devices are not generating audio signals;
    generating a power saving signal, wherein said power saving signal indicates a power saving state in which all of said mute signals and all of said mute logic signals indicate said muted state; and
    attenuating an audio mixer circuit, wherein said audio mixer circuit enters a power saving mode when said power saving signal indicates said power saving state such that said audio mixer circuit can save power during a time in which said audio signals are not being generated.

10. The method of claim 9 wherein said step of generating power saving signal further comprises receiving a system power state signal, wherein said power saving signal indicates a power saving state only when all of said mute signals, all of said mute logic signals, and system power state signal indicate said muted state.

11. The method of claim 9 wherein one of said plurality of mute signal enabled audio devices is a modem.

12. The method of claim 9 wherein one of said plurality of mute signal enabled audio devices is a CD-ROM drive.

13. The method of claim 9 wherein one of said plurality of mute signal enabled audio devices is a DVD drive.

14. The method of claim 9 wherein one of said plurality of non-mute signal enabled audio devices is a system beeper.

15. The method of claim 9 wherein one of said plurality of mute signal enabled audio devices is a ZV port PCMCIA card slot.

* * * * *